Dec. 10, 1968   F. GOGGINS   3,415,537
ANTISKID APPARATUS FOR A VEHICLE
Filed April 12, 1967   6 Sheets-Sheet 1
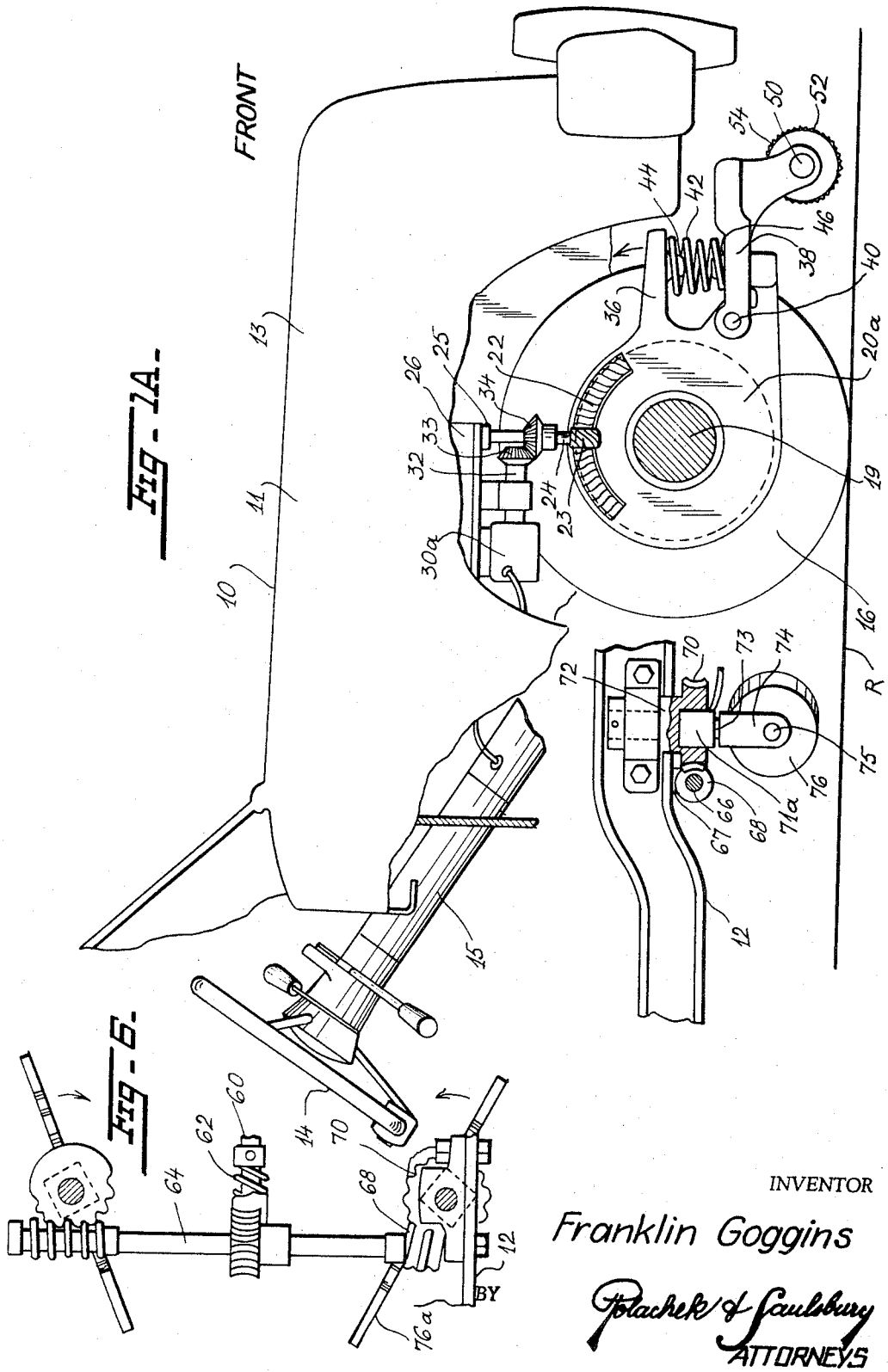
INVENTOR
Franklin Goggins
BY Polachek & Saulsbury
ATTORNEYS

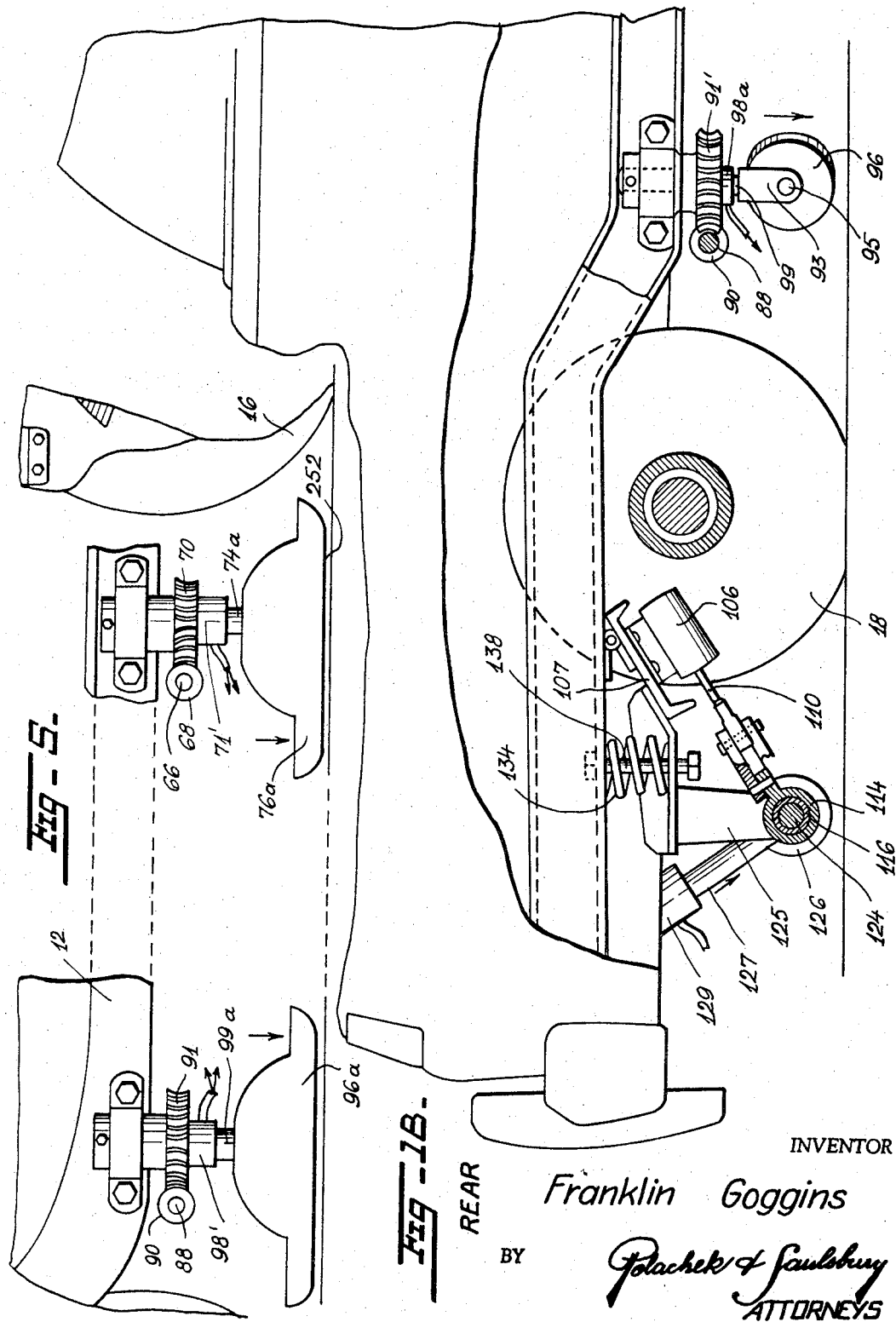

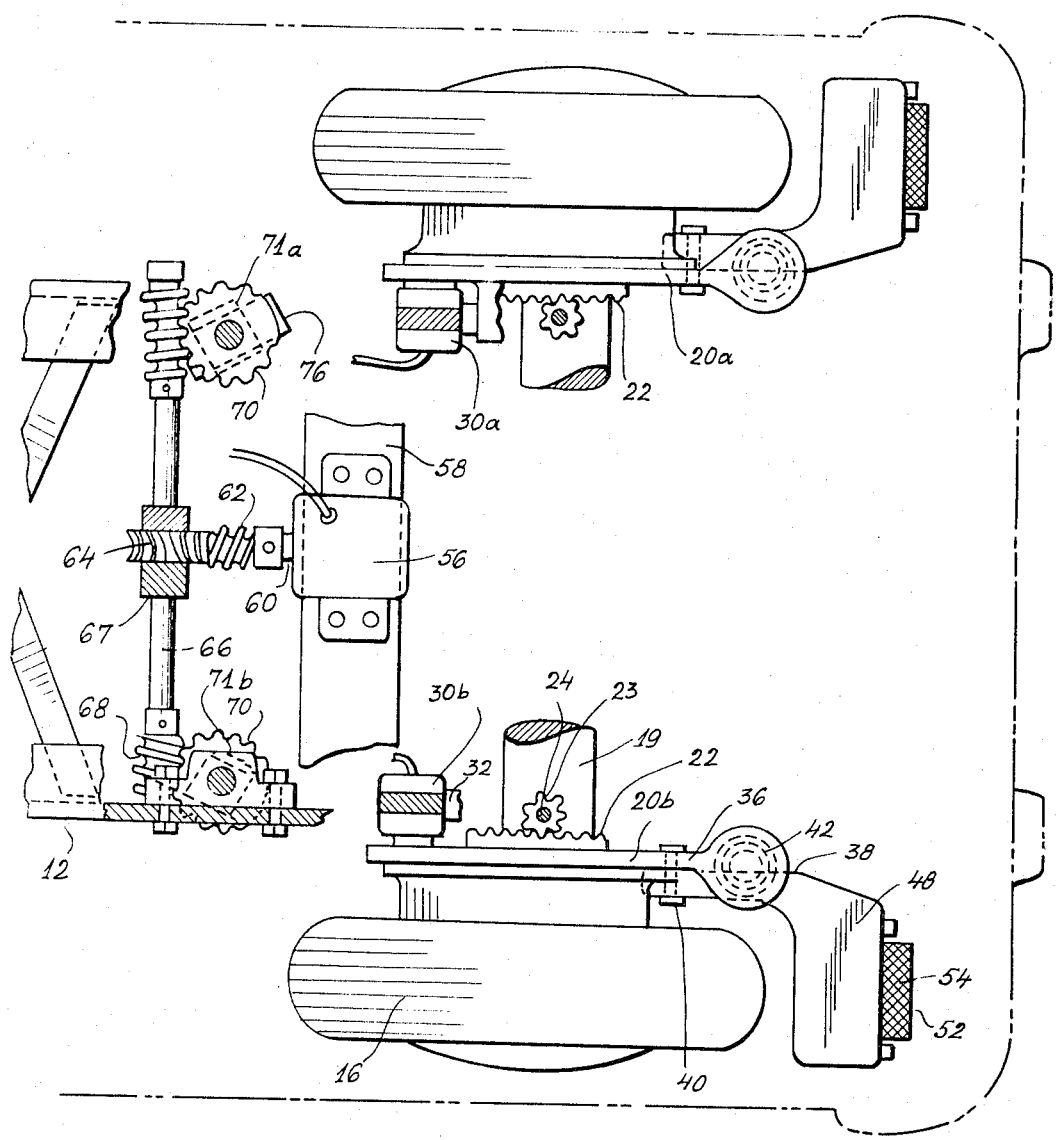

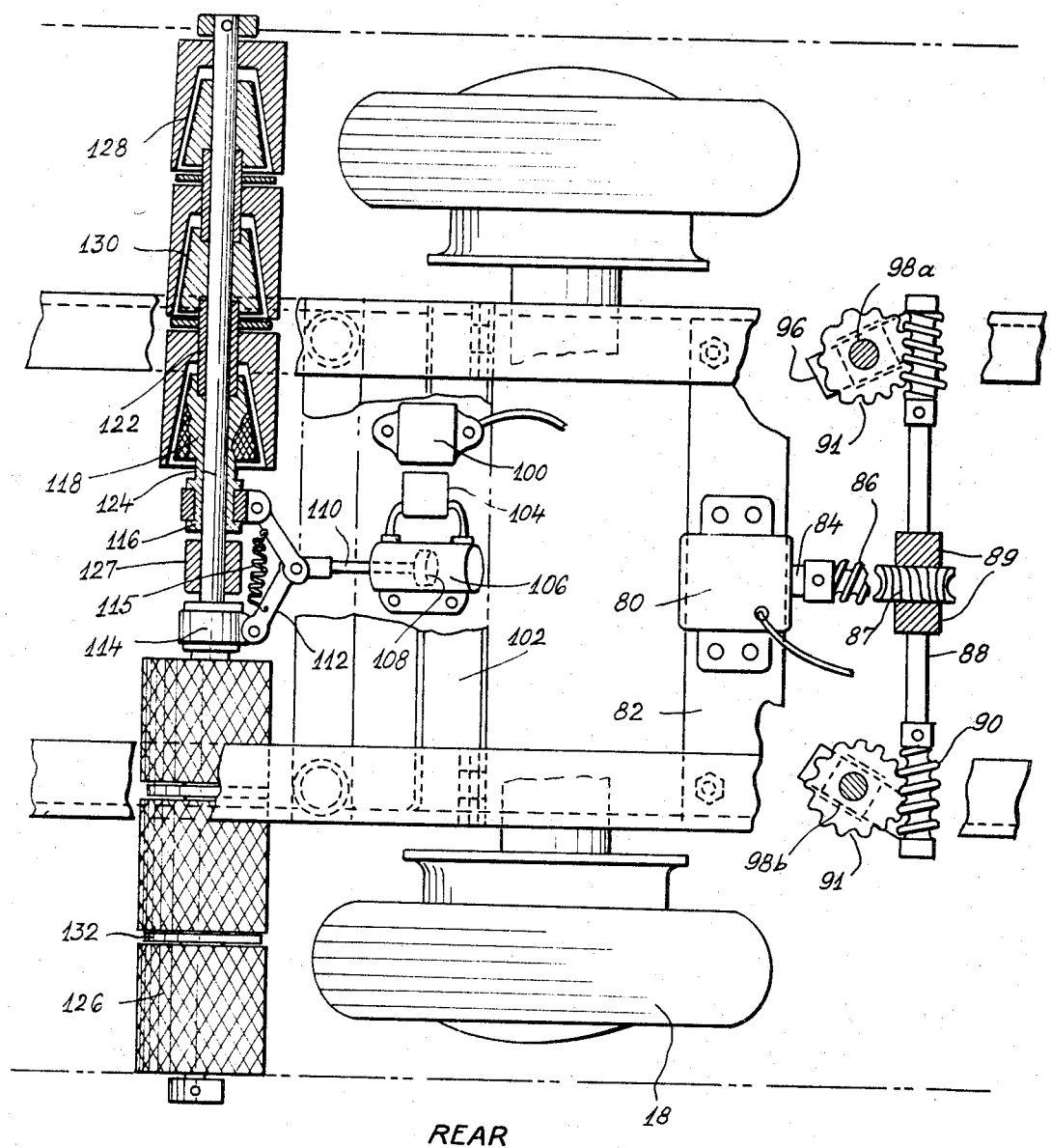

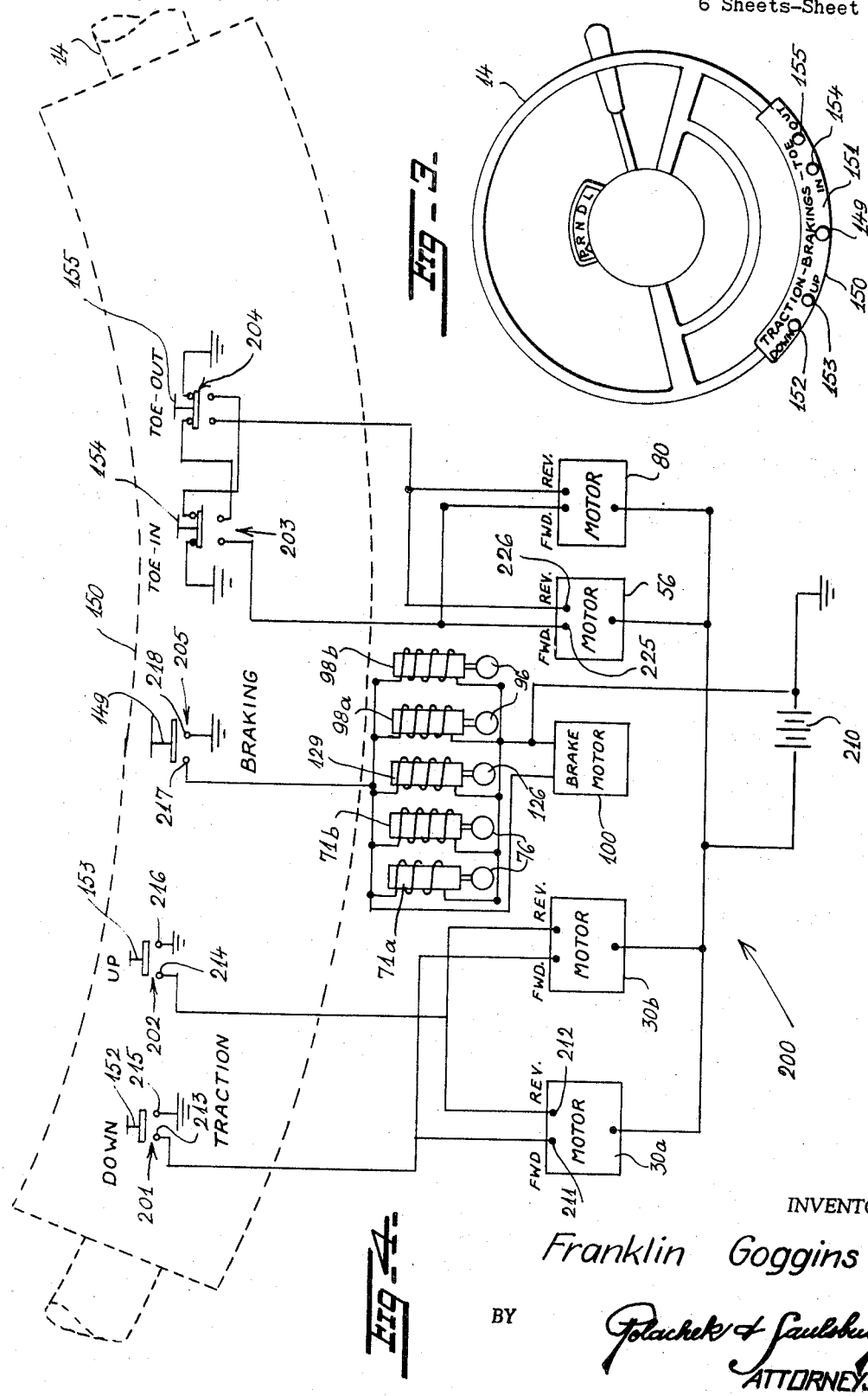

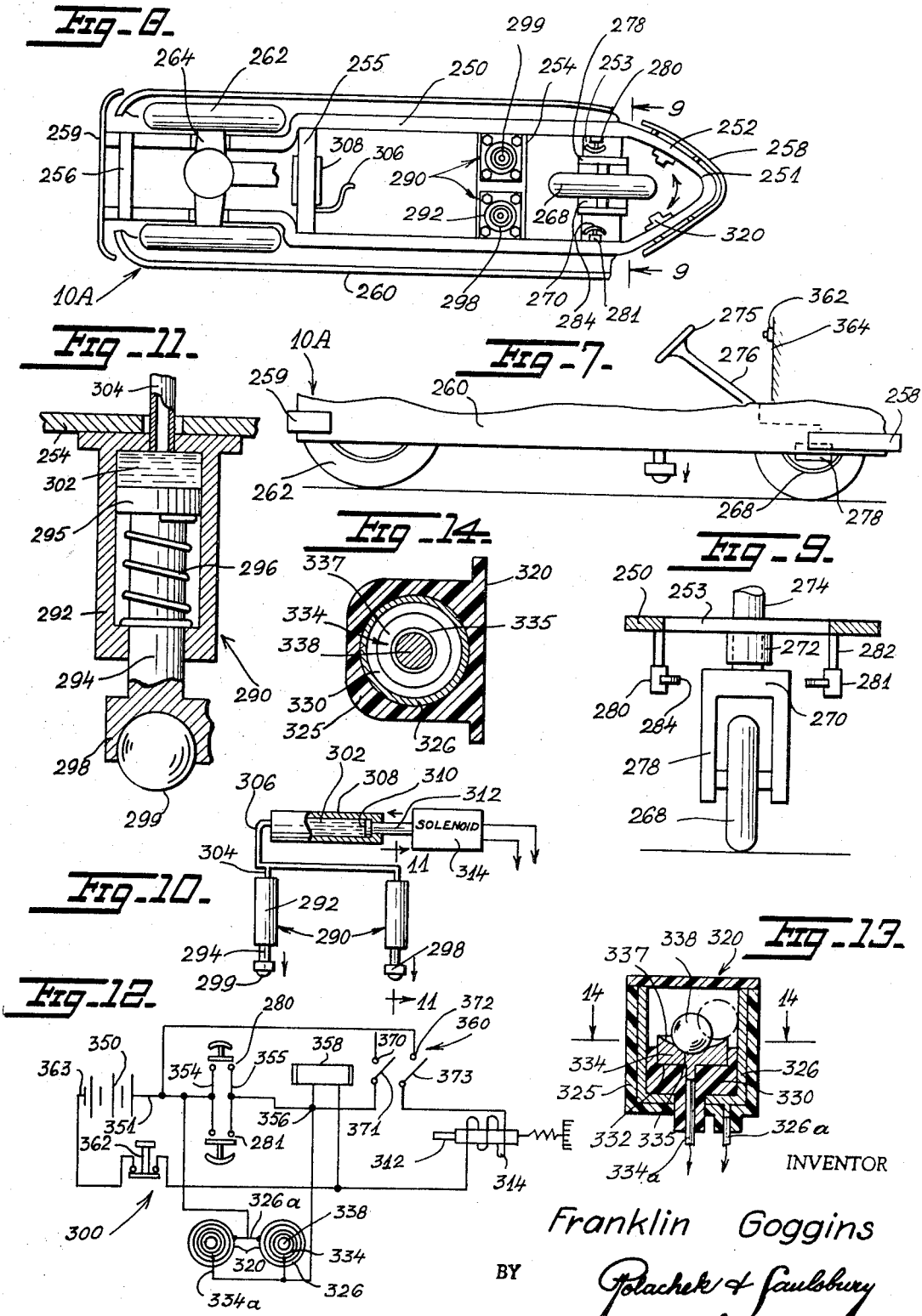

United States Patent Office 3,415,537
Patented Dec. 10, 1968

3,415,537
ANTISKID APPARATUS FOR A VEHICLE
Franklin Goggins, White Plains, N.Y., assignor to True Car Value, Inc., White Plains, N.Y.
Filed Apr. 12, 1967, Ser. No. 630,428
10 Claims. (Cl. 280—150)

ABSTRACT OF THE DISCLOSURE

The disclosure describes apparatus which can be attached to a conventional vehicle such as an automobile, bus, truck, and the like for stopping a skid on a slippery surface. The apparatus is under the control of the driver during an emergency. It includes auxiliary wheels and rollers operated by motors and electromagnets, and brought into operation during the emergency to apply traction to the slippery surface. The apparatus includes auxiliary wheels or blades which can be applied to the slippery surface in camber, either toe-out or toe-in. Further auxiliary wheels at the front apply traction and prevent excessive front dip of the vehicle while stopping the skid. Auxiliary traction rollers with internal braking members are provided at the back of the vehicle. A three-wheel vehicle is also described, provided with auxiliary lateral rollers or casters which are set down automatically when the front steerable wheel is turned too far or when the vehicle encounters an obstruction, so that the vehicle is held stable while being laterally deflected.

---

The invention concerns automatic anti-skid stabilizing apparatus for automotive vehicles. It also concerns apparatus for keeping a vehicle stable in the event of a laterally directed impact, a sudden lateral turn, or an excessive lateral turn.

One object of the invention is to provide means under the control of the driver of a vehicle such as an automobile, bus, truck and the like, for effectively engaging a slippery street or road in case of an emergency to prevent lateral and forward skid of the vehicle.

A further object is to provide anti-skid apparatus including one or more pairs of auxiliary wheels having adjustable camber for effectively stopping a skid.

Another object is to provide means as above described and further including auxiliary braking means comprising aligned rollers with internal braking members located at the rear of the vehicle.

Another object is to provide a vehicle with anti-skid apparatus as described and including auxiliary rollers for applying additional traction to a slippery roadway to stop a skid and for preventing undesired dip of the front end of the vehicle during the anti-skid operation.

Still another object is to provide anti-skid apparatus especially adapted for stopping a skid on ice or on an icy pavement, and including pairs of blades which can be applied to the surface of the ice in toe-out or toe-in camber for effectively stopping the skid.

A further object is to provide a three-wheel vehicle with automatically operated auxiliary caster wheels for keeping the vehicle stable in the event of a sudden or excessive lateral turn.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1A together with FIG. 1B are side elevational views with portions broken away of front and rear parts respectively of an automotive vehicle equipped with apparatus embodying the invention.

FIGS. 2A and 2B taken together are plan views with portions broken away of the front and rear parts respectively of the vehicle equipped with the apparatus embodying the invention.

FIG. 3 is a plan view of a steering wheel equipped with a control box for the apparatus.

FIG. 4 is a diagram of the electrical system of the apparatus.

FIG. 5 is a side view similar to parts of FIGS. 1A and 1B showing a modification of the invention.

FIG. 6 is a plan view similar to a part of FIG. 2A showing the modification of FIG. 5.

FIG. 7 is a side view of part of another vehicle embodying the invention.

FIG. 8 is a bottom plan view of the vehicle of FIG. 7.

FIG. 9 is an enlarged cross sectional view taken on line 9—9 of FIG. 8.

FIG. 10 is a side view partially in section and partially diagrammatic of a hydraulic system for operating auxiliary wheels of the vehicle of FIGS. 7-9.

FIG. 11 is an enlarged vertical sectional view taken on line 11—11 of FIG. 10.

FIG. 12 is a diagram of an electrical system employed in the vehicle of FIGS. 7-9 for operating the hydraulic system of FIG. 10.

FIG. 13 is an enlarged vertical view of an inertia switch employed in the vehicle of FIGS. 7-9.

FIG. 14 is a horizontal sectional view taken on line 14—14 of FIG. 13.

Referring first to FIGS. 1A, 1B, 2A and 2B, there is shown an automotive vehicle 10 having a body 11, chassis frame 12, hood 13, steering wheel 14, steering post 15, front wheels 16, rear wheels 18, and front axle 19. To the extent described, the vehicle is conventional.

Now according to the invention, there is provided on the front axle 19 a pair of angularly rotatable plates 20a, 20b; see FIGS. 1A and 2A. Each of these plates carries a segment of a worm gear 22. Engaged with this worm gear is a worm 23 carried by a shaft 24 journalled in the bearing 25 attached to a bracket 26. The bracket is secured to the chassis frame 12. The bracket carries a reversible electric motor 30a and 30b. Shaft 32 of each motor carries a bevel gear 33 engaged with a bevel gear 34 on shaft 24. There are two motors, one on each side of the vehicle. When the motors 30a, 30b are operated, plates 20a, 20b will be turned in one direction or the other in a vertical plane.

Extending forwardly from and radially of each of plates 20a, 20b is fixed arm 36. Another arm 38 is pivotally mounted by pin 40 just below arm 36. Shock absorbing spring 42 is engaged between opposing lugs 44, 46 on these arms. At its forward end each arm 38 has a fork 48 carrying shaft 50 on which is a massive rotatable roller 52 with roughened surface 54. Normally the rollers 52 will be spaced from the roadway R as indicated in FIG. 1A.

Rearwardly of the front wheels another reversible motor 56 is secured centrally of a cross beam 58 forming part of the chassis frame 12. This motor has a shaft 60 carrying a helical gear 62 engaged with a helical spur gear 64. Gear 64 is carried by a cross shaft 66 rotatably supported by bearings 67 secured to the chassis frame. At its opposite ends, shaft 66 carries worms 68 each engaged with a horizontal gear 70. Gears 70 are rotatably supported by bearing brackets 72 attached to sides of the chassis frame.

Set in each gear 70 is an electromagnet 71a or 71b. Each electromagnet has a plunger 73 carrying fork 74 projecting downwardly and carrying a shaft 75 on which is a wheel or roller 76. Wheel 76 is normally elevated above the roadway R.

When motor 56 is operated the wheels 76 will be turned simultaneously on vertical axes in one direction or another so that they can be disposed in vertical planes at angles to the vertical planes of wheels 16. When the electromagnets 71a, 71b are operated wheels 76 are applied to the roadway R.

Referring now to FIGS. 1B and 2B, a reversible motor 80 is attached to cross beam 82 forming part of the chassis frame 12 and located just forwardly of rear wheels 18. This motor has a shaft 84 carrying a helical gear 86 engaged with a helical spur gear 87. Gear 87 is carried by a cross shaft 88 rotatably supported by bearings 89 secured to the chassis frame. At its opposite ends shaft 88 carries worms 90 each engaged with a horizontal gear 91. Gears 91 are rotatably supported by bearing brackets attached to sides of the chassis frame. Each gear 91 carries electromagnet 98a or 98b which has a plunger 99 attached to fork 93 projecting downwardly and carrying a shaft 95 on which is a massive wheel 96. Wheels 96 are normally elevated above the roadway and are lowered when the electromagnets 98a, 98b are energized.

When motor 80 is operated the wheels 96 will be turned simultaneously on vertical axes so that they can be disposed in vertical planes at angles to the vertical planes of wheels 18.

Just rearwardly of the rear wheels is a motor 100 mounted to cross beam 102 at the underside of the chassis frame. This motor drives a hydraulic motor including a pump 104 and cylinder 106 in which is a reciprocatable piston 108. The pump and cylinder are secured to plates 107 pivotally mounted to the chassis frame. Piston shaft 110 extends downwardly and rearwardly and carries a pair of pivotable arms 112 disposed in a V-shaped arrangement and normally biased inwardly by springs 115. Arms 112 are engaged with rings 114 engaged with channeled hubs 116 of braking cores 118. On each side of the assembly are three braking cores 118. They are disposed in axial alignment and are connected by sleeve 122. The cores and sleeves are axially slidable on a cross shaft 124 supported by end brackets 125 attached to plates 107. Rotatable on the shaft 124 alternating with the cores are braking rollers 126. These rollers have conical recesses 128 in which the conical cores 118 are movably disposed. The cores have roughened surfaces 130. Interposed between the cylindrical rollers 126 are circular spacer disks 132. Attached to shaft 124 is plunger 127 of electromagnet 129. Normally rollers 126 will be elevated above the roadway and will be applied to the roadway when the electromagnet is energized. When motor 100 is energized shaft 110 will be extended rearwardly from the cylinder 106 and the arms 112 will spread out. The sets of cores 118 will be moved outwardly laterally of the vehicle to press against the inside walls of rollers 126 respectively so as to retard their rotation. Springs 134 on fixed vertical shafts 138 are interposed between the brackets 125 and the chassis frame to serve as shock absorbers.

FIGS 1A and 3 show steering wheel 14 provided with an arcuate tubular control box 150 mounted thereon. Inside the box are control switches. On this box is a panel 151 having one pair of control buttons 152, 153 for controlling the front traction rollers 52. A second pair of control buttons 154, 155 control camber of wheels 76, 96. Center button 149 controls braking of the vehicle to stop a skid once it starts.

The control circuit 200 of the apparatus is shown in FIG. 4. The control box 150 on steering wheel 14 is shown in dotted lines. In this box are single pole pushbutton switches 201–205. Switches 201, 202 have control buttons 152, 153 for controlling traction rollers 52. Switches 203, 203 have have control buttons 154, 155 for controlling camber of wheels 76, 96. Switch 205 controls auxiliary braking. Reversible motors 30a 30b are connected in parallel to battery 210 which is the usual battery provided in an automotive vehicle or it can be a separate battery. Both motors have forward drive and reversing terminals 211, 212 connected in parallel. Terminals 211 are connected to normally open terminal 213 of switch 201. Terminals 212 are connected to normally open terminal 214 of switch 202. Terminals 215, 216 of the switches are grounded to the battery. All electromagnets and motor 100 are connected at one end to open terminal 217 of switch 205. Terminal 218 is grounded. The other end of the electromagnets and motor 100 is connected to the battery 210.

Motors 56, 80 are connected like motors 31a, 31b in parallel with each other to the two switches 203 and 204. They are arranged like switches 201, 202 so that when forward drive terminals 225 of the motors are connected to the battery on operation of switch 203, the wheels 76, 96 are turned in toe-in direction. When the reversing terminals 226 are connected to the battery on operation of switch 204, the wheels 76, 96 are turned in toe-out position.

In operation of the system, the vehicle will be driven along roadway R supported by its principal wheels 16 and 18. Suppose a wet or slippery section of the roadway is encountered. The operator will press down switch button 152. This will cause motors 30a, 30b to be operated and rollers 52 will be applied to the roadway to increase traction. Suppose the vehicle encounters a section covered with ice, snow, loose gravel or mud and begins to skid. Button 149 will be pressed. Wheels 76, 96 and rollers 126 will be applied to the roadway as the electromagnets are energized. At the same time motor 100 operates.

The braking cores 118 are applied to the braking rollers 126 to cause them to effect a stabilizing and braking effect on the vehicle. After the emergency is over and the vehicle is either stopped or slowed down sufficiently to stop the skid, the driver will release switch button 149 to let the rollers 126 and wheels 76, 96 assume their normal elevated positions.

When the toe-in or toe-out wheels 76, 96 are applied to the roadway they are dragged along digging into the ice, snow or other slippery road surface. The magnitude of the drag depends on the angular position of the wheels to the forward direction of drive of the vehicle. This angle can be changed by selective operation of switches 203 and 204. The forward rollers 30a, 30b serve the function, in addition to providing more traction, of keeping the vehicle level and preventing undesired dipping at the front when the vehicle is quickly braked by the auxiliary braking wheels and rollers.

FIGS. 5 and 6 show a modification of the invention in which parts having the same functions and structure as previously described have the same numbering. In this modification, blades 76a and 96a with sharp edges 252 are provided in place of wheels 76 and 96. They are normally elevated above roadway R by plungers 74a and 99a of electromagnets 71' and 98' carried by gears 70 and 91 respectively. These blades can be oriented in toe-in or toe-out camber by operation of motors 56 and 80 in the same manner as described above in connection with circuit 200. The use of blades is preferred where the vehicle is dirven on ice or packed snow.

The invention can be installed in any conventional vehicle without requiring any major alteration. The auxiliary wheels and rollers insure safe driving and full control of the vehicle under severe slippery conditions, when ordinary chains, snow tires and the like are ineffective.

In FIGS. 7–9 is shown another vehicle 10A which has a horizontal elongated chassis frame 250 with a tapered generally V-shaped front end 251 defined by integral opposing rail portions 252 disposed angularly to the fore-and-aft longitudinal axis of symmetry of the frame. The frame has a plurality of cross bars 253–256 which stiffen the frame. Attached to the front rail portions is a generally V-shaped bumper 258. A straight bumper 259 with curved ends is attached to rear cross bar 256.

The vehicle has a body 260 of any desired configuration suitably mounted on the chassis frame 250. The vehicle has a pair of rear drive wheels 262 rotatably supported by axles in axle housings 264 secured to the frame. The vehicle has a single front wheel 268 centered on the longitudinal plane of symmetry of the vehicle. The wheel is carried by a U-bar or yoke 270 which is turnable in axially vertical bearing 272 carried by cross bar 253. Shaft 274 connected to yoke 270 is operatively connected to steering wheel 275 mounted rotatably on steering post 276 inside the body of the vehicle.

Yoke 270 has flat sides 278 which are normally spaced from a pair of pushbutton switches 280, 281 mounted on depending posts 282 secured to inner sides of the frame. The switches have arcuate push-plates 284 so disposed that if the wheel 268 and yoke 270 are turned angularly more than a predetermined amount either to the right or left as viewed in FIG. 9, either one of switches 280, 281 will be closed. The switches are connected in a control circuit which is described below.

The vehicle 10A also has a pair of auxiliary wheel assemblies 290 secured to cross bar 254. Each wheel assembly has an axially vertical housing 292 shown to best advantage in FIG. 11. The housings are disposed laterally of the wheel 268 and yoke 270 as closed as possible to the sides of frame 250. Inside each housing is an axially movable shaft 294 provided with a head 295. A coil spring 296 inside the housing bears against the head and holds the shaft retracted. At its lower end, each shaft has an enlarged block 298 in which is a rotatable ball 299. The balls 299 serve as auxiliary wheels when the shafts 294 are extended down until the balls contact the roadway. Normally the auxiliary wheels are elevated above the roadway as best shown in FIG. 7. Each housing 292 is a closed cylinder which is kept filled with hydraulic fluid 302 above head 295 via branch pipes 304 fed from a common pipe 306. Pipe 306 is connected to one end of hydraulic cylinder 308 in which is a piston head 310 attached to plunger 312 by a solenoid 314. The solenoid is electrically operated so as to advance the plunger 312 and drive fluid 302 into the housing 292 for lowering the wheels. Cylinder 308 is carried by frame bar 255.

The vehicle is further provided with a pair of inertia switches 320 mounted on inner sides of angularly disposed rail portions 252 forward of wheel 268. Each of these switches includes a hollow casing 325 as best shown in FIGS. 13 and 14. Inside the insulative casing is a metal shell 326. Inside the metal shell is an insulative block 330. The block has a recess 332 on its upper side in which is set a metal plate 334. Plate 334 has a spherically curved recess 335 in which rests a metal ball 338. Plate 334 also has a conical face 337 surrounding recess 335. When ball 338 is displaced from recess 335 it rolls up on face 337 and as shown in dotted line in FIG. 13, bridges electrically plate 334 and metal shell 326. The inertia switches have conductors 326a, 334a connected in circuit 300 shown in FIG. 12 to which reference is now made.

Battery 350 of the vehicle has one terminal 351 connected to one terminal 354 of each switch 280, 281 and to each of shells 326. The other terminals 355 of switches have normally open contacts connected in parallel with each other, and the parallel network of switches is connected in series with the battery. Junction point 356 is connected to one end of coil 358 of relay 360. The other end of the relay coil is connected via normally closed pushbutton switch 362 to the other terminal 363 of the battery. Pushbutton switch 362 is located at dashboard 364 of the vehicle near steering wheel 276 as shown in FIG. 7.

Relay 360 has normally open contacts 370, 371 and 372, 373. Contacts 370, 371 bridge the parallel network of switches to energize relay coil 358. Contacts 372, 373 are connected in series with solenoid 314 which drives plunger 312 when energized. A retracting spring is connected to the plunger 312.

In operation of the system including circuit 300, the vehicle 10A will normally ride on wheels 262, 268. If the operator should turn the steering wheel 275 beyond a certain point to the right or left, the yoke 270 turning with the steering wheel will close switch 280 or 281. This will energize relay 360 and cause the solenoid 314 to become energized. The solenoid will operate the hydraulic cylinder 308 and both wheel assemblies will be actuated to lower the caster wheels 299. Thus the vehicle will be stabilized on the two caster wheels. When the operator turns the wheel 268 forwardly again, the wheel assemblies will remain extended because relay contacts 370, 371 act as a holding circuit. To retract the auxiliary caster wheels, the operator will press pushbutton 362. This will deenergize the relay 360 and allow the wheel assemblies to retract as contracted springs 296 expand in housings 292.

If the vehicle encounters an obstruction which tends to push the vehicle laterally upon encountering the V-shaped bumper 258, the wheel assemblies will again be operated automatically. This will occur because one or both inertia switches 320 will be actuated and closed. Ball 338 will be displaced and will ride up the inclined face of plate 334 to contact shell 326. When the accelerating or decelerating force which displaced the ball 338 terminates, the relay 360 will remain energized via the holding contacts 370, 371. Thus the vehicle will be stabilized in the event of an applied lateral force tending to upset the vehicle. The auxiliary caster wheels will remain extended until pushbutton 362 is pressed releasing them. Vehicle 10A is thus provided with automatic means for stabilizing the vehicle in the event of a condition occurring which tends to upset the vehicle.

What is claimed is:

1. Anti-skid apparatus for a vehicle having front and rear wheels operatively supported by a chassis frame; said apparatus comprising a pair of traction rollers, means supporting said rollers in advance of said front wheels and normally elevated above a roadway, first motor means supported by said chassis frame, gear means driven by said motor means and operatively connected to said traction roller supporting means to move said rollers into roadway engaging position for increasing traction thereon and for limiting downward dipping of the front end of the vehicle when the vehicle is braked, a pair of anti-skid members, means supporting said members rearwardly of the front wheels and normally elevated above the roadway, said anti-skid members being disposable in first vertical planes at angles to longitudinally extending vertical planes of said wheels, and second motor means for applying said anti-skid members to the roadway for dragging along the roadway to stop the vehicle from skidding.

2. Anti-skid apparatus as recited in claim 1, wherein said anti-skid members are rotatable wheels, and wherein said apparatus further comprises third motor means for turning said last mentioned wheels on vertical axes for changing the direction of orientation of said last mentioned wheels in the first vertical planes with respect to said longitudinal planes.

3. Anti-skid apparatus as recited in claim 1, wherein said anti-skid members are blades with sharp, straight bottom edges, and wherein said apparatus further comprises third motor means for turning said blades on vertical axes for changing the direction of orientation of the blades in the first vertical planes with respect to said longitudinal planes.

4. Anti-skid apparatus as recited in claim 1, wherein said vehicle has a driver's position, and wherein said apparatus further comprises a control switch assembly at said driver's position, said switch assembly being connected in circuit with the first and second motor means for operation by the driver to apply said rollers and anti-skid members to the roadway.

5. Anti-skid apparatus as recited in claim 1, wherein said apparatus further comprises third motor means for turning the anti-skid members on vertical axes for changing the direction of orientation of said members in the first vertical planes with respect to the longitudinal planes of the wheels.

6. Anti-skid apparatus as recited in claim 5, further comprising a plurality of braking rollers, means supporting said braking rollers in horizontal axial alignment to the rear of said rear wheels and normally elevated from the roadway, fourth motor means for applying said braking rollers to the roadway to stabilize the vehicle, braking cores in said braking rollers, and fifth motor means for applying said braking cores to the braking rollers to retard rotation of the same for slowing down movement of the vehicle.

7. Anti-skid apparatus as recited in claim 6, wherein said vehicle has a driver's position, and wherein said apparatus further comprises a control switch assembly, said control switch assembly being connected in circuit with the first, second, third, fourth and fifth motor means for selectively applying said traction rollers, braking rollers and anti-skid members to the roadway, and for controllably turning the anti-skid members on said vertical axes and for applying said braking cores to said braking rollers.

8. Anti-skid apparatus as in claim 7 and further comprising another pair of anti-skid members, means supporting said other pair of anti-skid members rearwardly of the first named anti-skid members and forwardly of the rear wheels, said other anti-skid members being rotatable on other vertical axes for orienting the other anti-skid members in other vertical planes at angles to the longitudinal planes of the wheels, sixth motor means for applying the other anti-skid members to the roadway, and seventh motor means for adjustably turning said other anti-skid members on said vertical axes.

9. Anti-skid apparatus as recited in claim 8, wherein said switch assembly is further connected in circuit with said sixth and seventh motor means for selectively applying said other anti-skid members to the roadway and for controllably turning said other anti-skid members on said other vertical axes.

10. Anti-skid apparatus as recited in claim 1, wherein said vehicle has a driver's position, and wherein said apparatus further comprises third motor means for turning said anti-skid members on vertical axes for changing the direction of orientation of said members in the first vertical planes with respect to said longitudinal planes, and a control switch assembly at said driver's position, said switch assembly being connected in circuit with the first, second and third motor means for selectively applying said rollers and anti-skid members to the roadway and for adjustably turning said anti-skid members on said vertical axes.

No references cited.

A. HARRY LEVY, *Primary Examiner.*

U.S. Cl. X.R.

180—1, 15, 21, 78, 91; 188—5, 71; 200—61.45; 280—43.23